United States Patent Office 3,087,907
Patented Apr. 30, 1963

3,087,907
VINYLPYRIDINE COPOLYMER RUBBER COMPOSITION CONTAINING METALLIC HALIDE
William F. Brucksch, Jr., North Caldwell, N.J., assignor to United States Rubber Company, New York, N.Y., a corporation of New Jersey
No Drawing. Filed Apr. 29, 1960, Ser. No. 25,523
27 Claims. (Cl. 260—41.5)

This invention relates to an improved vinylpyridine copolymer rubber composition, and more particularly it relates to a vinylpyridine copolymer rubber composition containing an inorganic halide, characterized by improved resistance to cut-growth on flexing.

Vinylpyridine copolymer rubber compositions have certain desirable characteristics, notably high abrasion resistance, which render them useful in making treads for pneumatic tires, and other articles. However, it has been desired to improve upon the properties of such compositions, especially from the standpoint of resistance to cut-growth on flexing.

In accordance with the present invention, it has now been discovered that the incorporation, in the vinyl-pyridine copolymer rubber stock conventionally compounded for vulcanization, of certain metallic halides, viz., a metallic halide selected from the group consisting of magnesium chloride, calcium chloride, zinc chloride and zinc bromide, not only greatly improves the cut-growth resistance of vulcanizates made from such copolymer rubber, but also enhances the already high level of abrasion resistance. The invention also makes it possible to achieve a high level of tensile strength at a temperature of 212° F. as well as a level of elongation at 212° F. which is higher than the elongation at room temperature.

The vinylpyridine copolymer rubber employed in the invention is a copolymer of any monovinylpyridine, such as 2-vinylpyridine, 5-ethyl-2-vinylpyridine, 2-methyl-5-vinylpyridine, 4-vinylpyridine or 2-methyl-6-vinylpyridine, with a conjugated diene, such as butadiene or its equivalents (e.g., isoprene), with or without a third copolymerizable material, such as styrene. Usually the copolymer contains from 70% to 95% by weight of the diene and correspondingly from 30% to 5% of the vinylpyridine. The styrene or the like may range up to 25% (and usually amounts to at least 5%) of the total copolymer, with the provisio that the sum of the styrene content and the vinylpyridine content should not exceed 30% of the total copolymer.

In accordance with the invention the metallic halide may be incorporated in the vinylpyridine copolymer rubber composition in various ways. A convenient point of addition is after the addition of any reinforcing filler such as carbon black and before addition of curatives. Mixing may be by roll mill, Banbury or extruder, any of those methods familiar in the rubber industry. The point of addition of the metallic halide may be at any step of the process; to the rubber, or to the rubber plus filler or to the rubber plus filler plus curatives. The metallic halide may be added as such in solid form, or in the form of a solution in an appropriate solvent followed by evaporation of the solvent so that the metallic halide remains in the stock.

A surprising physical effect is observed when the metallic halide, such as zinc chloride, is milled into the vinylpyridine copolymer. The rubber becomes stronger and more resilient, having the property of a partial vulcanizate, yet can be milled and can be stretched into a tough film, whereas the milled vinylpyridine rubber alone is so much weaker that it cannot be stretched into film form. While it is not desired to limit the invention of any particular theory of operation, the added strength is thought to be due to complex formation between the metallic chloride and the pyridine groups in the rubber.

No such effect is observed if zinc chloride is milled into SBR.

My vinylpyridine copolymer rubber/zinc chloride composition also differs from the SBR/zinc chloride composition of Harbison, U.S. Patent No. 2,565,812, August 28, 1951, in scorch resistance. Whereas Harbison's rubber is rendered more resistant to scorch, vinylpyridine copolymer rubber is rendered less resistant to scorch by the presence of added zinc chloride.

Also, when SBR is compounded with added zinc chloride, there is no advantage either in resistance to abrasion or in resistance to cut growth. This is in marked contract to the remarkable improvements in abrasion resistance and cut-growth resistance obtained when the metallic halide is compounded with vinylpyridine copolymer rubber in accordance with the invention.

For purposes of the invention, I employ at least 1 part by weight, and in general from 1 to about 8 parts, preferably about 2 to 5 parts, of metallic halide per 100 parts by weight of the vinylpyridine copolymer rubber.

The vinylpyridine copolymer/metallic halide composition is compounded for vulcanization in accordance with conventional practice. The composition may include the usual rubber compounding ingredients, such as reinforcing fillers (usually in amounts of 25–75 parts per 100 parts by weight of copolymer) including carbon blacks of low pH or high pH, silica, and lignin, softeners or processing aids; extenders including naphthenic or asphaltic oils; antioxidants, and the like, in accordance with the usual practice in the rubber compounding art. Any suitable vulcanizing agent (e.g., sulfur, or an organic peroxide such as dicumyl peroxide) or accelerator conventionally used for vulcanizing vinylpyridine copolymer rubber may be used, in conventional amounts.

It will be understood that the metal halide is not to be thought of as a curing agent for the vinylpyridine copolymer, and the vinylpyridine copolymer must be compounded with some conventional vulcanizing agent in order to enjoy the advantages of the invention. Preferred stocks contain from 25 to 75 parts by weight of carbon black per 100 parts of the vinylpyridine copolymer rubber. The compositions may be shaped into any desired form by the usual fabricating methods such as extrusion, calendering, and molding, and the shaped articles may be vulcanized under heat and pressure, using conventional vulcanizing equipment and conditions.

The invention is particularly useful in articles where the combination of abrasion resistance and resistance to cut-growth is desired, such as in tire treads and in articles which undergo fatigue flexing. Other applications may take advantage of the higher tensile strength at 212° F. and the higher elongation at 212° F., made possible by the invention.

I frequently find it advantageous to "hot process," or "low hysteresis process," the mixture of vinylpyridine copolymer rubber and filler, for example by milling it for 5–30 minutes at temperatures in the range 275°–350° F., preferably after addition of the metallic halide, but in any case prior to the addition of curatives. Such hot processed material, when subsequently compounded for vulcanization and vulcanized, shows superior elastic properties, compared to an otherwise similar vulcanizate that has not been hot processed.

The following examples, in which all parts are expressed by weight, will serve to illustrate the practice of the invention in more detail.

The experimental details in all examples are as follows:
The vinylpyridine copolymer rubber employed in the examples is an emulsion copolymer of butadiene-2-methyl-5-vinylpyridine (75/25 charge ratio). Polymers of this type are described by J. R. Haws, "Rubbers From Basic Monomers. Vinylpyridine Polymers," Rubber Chem. Tech., 30, No. 5, 1387 (1957) (December).

The mixing procedure consists of preparation of a black "masterbatch" to which inorganic halides and curatives are added. The standard masterbatch of vinylpyridine rubber is mixed with filler according to the formula.

| Ingredients: | Parts by weight |
|---|---|
| 2-methyl-5-vinylpyridine/butadiene (25/75) rubber | 100 |
| Black | 50 |
| Softener (e.g. pine tar, rosin, oil, bitumen, or "Paraflux," an asphaltic rubber softening oil) | 6.0 |
| Zinc oxide | 3.0 |
| Stearic acid | 2.0 |
| Antioxidant (e.g., p-t-butyl cresol) | 1.0 |
| Total | 162.0 |

As indicated by the tables below, the carbon black employed is either "MPC" (medium processing channel), such as "Spheron 6" or "LFC" (long flow channel), such as "Mogul-A" or "HAF" (high abrasion furnace), such as "Philblack O."

The masterbatch is mixed in the "B" Banbury at 50 r.p.m. according to the following procedure:

| At time, minutes: | Add |
|---|---|
| 0 | Rubber. |
| 2 | ½ Black, Zinc Oxide, Antioxidant. |
| 4 | Softener. |
| 7 | ½ Black, Stearic Acid. |
| 12 | Discharge. |

Up to the time of discharge the temperature is controlled to not exceed 275° F. The masterbatch is then mill blended to provide a uniform stock for the addition of a metallic halide and curatives, on cold mill rolls.

The inorganic halides are employed in the examples as reagent grade chemicals: $MgCl_2 \cdot 6H_2O$, $CaCl_2$, $ZnCl_2$ and $ZnBr_2$. The halide is added to the masterbatch as a solution in either water or methanol. For each inorganic halide, a separate portion of masterbatch is used. The final stock is as follows (the particular amounts being given in the tables below):

| Final compounding ingredients: | Parts by weight |
|---|---|
| Masterbatch | 162. |
| Inorganic chloride | As shown. |
| Accelerator (e.g., benzal bisdimethyldithiocarbamate), "FLD" | Do. |
| Sulfur | Do. |

In stocks indicated by an asterisk (*) in the tables below, the masterbatch is combined with the inorganic halide and processed for 10 minutes on mill rolls heated to 300°–325° F. In each table, therefore, some of the tread-type compounds are subjected to an additional "heat processing" before addition of curatives.

Each compounded stock is vulcanized in a mold in a press, under the conditions indicated in the tables, to show the trend of properties in the range of 300% modulus from 1100 to 1600 p.s.i., and to permit a comparison of performance level between compounds of near-equal modulus (near 1300 p.s.i.).

Physical characteristics of the unvulcanized stocks, the proportions of added curatives, the time-temperature conditions of vulcanizing and the physical properties of the vulcanized products are set forth in the tables below. The Mooney viscosity of the compounded, unvulcanized stock is determined according to ASTM test D927–57T. The figures given under "Scorch, 265° F." represent the time in minutes from the minimum viscosity to a three point rise. These figures are obtained by the method described in ASTM test D1077–55T. Under "Cure," the value indicated as "Pounds" is the gauge steam pressure, expressed as p.s.i., in the heating platens of the molding press in which the stocks are cured. The expression "Log R" refers to the logarithm of the resistivity in ohm-centimeters. The hysteresis values are obtained according to the method of M. Mooney and R. H. Gerke [India Rubber World, 103, #4, 29 (1941)].

The cut-growth is measured essentially as described by E. E. Auer, K. W. Doak, I. J. Schaffner, Rubber Chem. and Tech. 31, 185 (1958), "Factors Affecting Laboratory Cut-Growth Resistance of Cold SBR Tread Stocks." The units are kilocycles per inch of cut. The "Relative Abrasion Resistance" value is a relative rating obtained by comparing the weight loss of a standard compound (rated 100) with the weight loss of the test compound.

EXAMPLE I

This example is a control, using MPC black with no added inorganic halide. The results shown in Table I are to be contrasted with the results obtained in subsequent examples.

*Table I*

VINYLPYRIDINE COPOLYMER RUBBER WITH MPC BLACK

[No added inorganic chloride]

| Stock code | I-A | I-B | I-C | I-D* | I-E* |
|---|---|---|---|---|---|
| Curatives: | | | | | |
| FLD | 0.5 | 0.7 | 0.9 | 0.5 | 0.7 |
| Sulfur | 1.75 | 1.75 | 1.75 | 1.75 | 1.4 |
| ML-4 212° F | 74 | 73 | 70 | 73 | 78 |
| Scorch, 265° F | 9 | 11 | 10 | 6 | 7 |
| Cure: | | | | | |
| Minutes | 90 | 90 | 45 | 45 | 45 |
| Pounds | 45 | 45 | 45 | 45 | 45 |
| Log R | 11.0 | 11.1 | 11.4 | >13.0 | >13.0 |
| 300% modulus | 1,180 | 1,270 | 1,220 | 1,240 | 1,170 |
| Tensile: | | | | | |
| R.T. | 3,570 | 3,630 | 3,420 | 3,540 | 3,280 |
| 212° F | 1,610 | 1,390 | 1,440 | 1,530 | 1,530 |
| Elongation: | | | | | |
| R.T. | 590 | 540 | 580 | 600 | 540 |
| 212° F | 490 | 400 | 450 | 470 | 470 |
| Torsional hysteresis: | | | | | |
| R.T. | .379 | .388 | .348 | .311 | .291 |
| 280° F | .205 | .218 | .211 | .138 | .125 |
| Cut-growth, 150° F | 295.2 | 205.0 | 251.4 | 249.6 | 282.9 |
| Relative abrasion resistance | 112.5 | 109.0 | 115.1 | 139.4 | 142.1 |

EXAMPLE II

In this example, 4.5 parts of magnesium chloride hexahydrate is included in the stocks, with the remarkable improvements shown in Table II.

*Table II*

VINYLPYRIDINE COPOLYMER RUBBER WITH MP BLACK

[Added magnesium chloride]

| Stock code | II-A | II-B | II-C | II-D* | II-E* |
|---|---|---|---|---|---|
| Curatives: | | | | | |
| FLD | 0.2 | 0.4 | 0.6 | 0.1 | 0.3 |
| Sulfur | 1.75 | 1.75 | 1.75 | 1.75 | 1.75 |
| $MgCl_2 \cdot 6H_2O$ | 4.5 | 4.5 | 4.5 | 4.5 | 4.5 |
| ML-4 212° F | 95 | 96 | ¹57 | ¹58 | ¹61 |
| Scorch, 265° F | 12 | 9 | 9 | 7 | 6 |
| Cure: | | | | | |
| Minutes | 60 | 40 | 30 | 40 | 30 |
| pounds | 45 | 45 | 45 | 45 | 45 |
| Log R | >13.0 | >13.0 | >13.0 | >13.0 | >13.0 |
| 300% modulus | 1,280 | 1,370 | 1,480 | 1,360 | 1,420 |
| Tensile: | | | | | |
| R.T. | 3,550 | 3,950 | 4,000 | 3,890 | 3,880 |
| 212° F | 1,890 | 2,070 | 2,050 | 1,820 | 1,730 |
| Elongation: | | | | | |
| R.T. | 540 | 570 | 570 | 550 | 510 |
| 212° F | 620 | 640 | 610 | 560 | 510 |
| Torsional hysteresis: | | | | | |
| R.T. | .361 | .329 | .348 | .347 | .333 |
| 280° F | .178 | .149 | .154 | .160 | .147 |
| Cut-growth, 150° F | 790.5 | 763.6 | 364.7 | 539.8 | 310.3 |
| Relative abrasion resistance | 176.8 | 210.8 | 176.3 | 189.1 | 200.2 |

¹ Small rotor.

This example may be repeated using a terpolymer of butadiene/vinylpyridine/styrene, 80/10/10, with equivalent results.

EXAMPLE III

This example uses 3.0 parts of calcium chloride, with results shown in Table III.

Table III
VINYLPYRIDINE COPOLYMER RUBBER WITH MPC BLACK
[Added calcium chloride]

| Stock code | III-A | III-B | III-C | III-D* | III-E* | III-F* |
|---|---|---|---|---|---|---|
| Curatives: | | | | | | |
| FLD | 0.2 | 0.4 | 0.6 | 0.1 | 0.3 | 0.5 |
| Sulfur | 1.75 | 1.75 | 1.75 | 1.75 | 1.75 | 1.75 |
| CaCl₂ (added as a 40% solution in water) | 3.0 | 3.0 | 3.0 | 3.0 | 3.0 | 3.0 |
| ML-4 212° F | 83 | 81 | 79 | 96 | 100 | 97 |
| Scorch, 265° F | 11 | 8 | 8 | 10 | 8 | 6 |
| Cure: | | | | | | |
| Minutes | 45 | 22 | 18 | 60 | 35 | 22 |
| Pounds | 45 | 45 | 45 | 45 | 45 | 45 |
| Log R | >13.0 | >13.0 | >13.0 | >13.0 | >13.0 | >13.0 |
| 300% modulus | 1,270 | 1,460 | 1,600 | 1,190 | 1,410 | 1,510 |
| Tensile: | | | | | | |
| R.T | 3,630 | 3,700 | 3,700 | 3,800 | 3,540 | 3,720 |
| 212° F | 1,630 | 1,800 | 1,780 | 1,380 | 1,600 | 1,760 |
| Elongation: | | | | | | |
| R.T | 590 | 560 | 520 | 600 | 540 | 530 |
| 212° F | 690 | 590 | 560 | 600 | 550 | 560 |
| Torsional hysteresis: | | | | | | |
| R.T | .322 | .304 | .306 | .333 | .320 | .309 |
| 280° F | .156 | .143 | .132 | .166 | .146 | .139 |
| Cut-growth, 150° F | 661.8 | 505.6 | 371.2 | 506.0 | 429.7 | 459.8 |
| Relative abrasion resistance | 165.7 | 169.7 | 171.5 | 163.9 | 170.8 | 161.5 |

EXAMPLE IV

This example employs 3.0 parts of zinc chloride, and gives the improved results shown in Table IV.

Table IV
VINYLPYRIDINE COPOLYMER RUBBER WITH MPC BLACK
[Added zinc chloride]

| Stock code | IV-A | IV-B | IV-C* | IV-D* | IV-E* |
|---|---|---|---|---|---|
| Curatives: | | | | | |
| FLD | 0.2 | 0.3 | 0.2 | | |
| Sulfur | 1.75 | 1.75 | 1.75 | 1.75 | 1.5 |
| ZnCl₂ | 3.0 | 3.0 | 3.0 | 3.0 | 3.0 |
| ML-4 212° F | 92 | 96 | 99 | 103 | 101 |
| Scorch, 265° F | 7 | 6 | 5 | 8 | 8 |
| Cure: | | | | | |
| Minutes | 22 | 22 | 22 | 35 | 40 |
| Pounds | 45 | 45 | 45 | 45 | 45 |
| Log R | 12.0 | 11.6 | 11.8 | 12.0 | 11.0 |
| 300% modulus | 1,160 | 1,410 | 1,350 | 1,480 | 1,360 |
| Tensile: | | | | | |
| R.T | 3,550 | 3,810 | 3,190 | 3,600 | 3,870 |
| 212° F | 1,590 | 1,890 | 1,450 | 1,820 | 1,630 |
| Elongation: | | | | | |
| R.T | 580 | 530 | 490 | 480 | 550 |
| 212° F | 670 | 630 | 560 | 570 | 580 |
| Torsional hysteresis: | | | | | |
| R.T | .372 | .335 | .347 | .357 | .361 |
| 280° F | .164 | .144 | .138 | .150 | .163 |
| Cut-growth, 150° F | 1,520 | 704.2 | 581.5 | 508.9 | 452.0 |
| Relative abrasion resistance | 221.0 | 243.0 | 231.7 | 249.5 | 238.5 |

EXAMPLE V

Zinc bromide is the metal halide in this example, the results of which are given in Table V.

Table V
VINYLPYRIDINE COPOLYMER RUBBER WITH MPC BLACK
[Added zinc bromide]

| Stock code | V-A | V-B | V-C | V-D* | V-E* | V-F* |
|---|---|---|---|---|---|---|
| Curatives: | | | | | | |
| FLD | 0.8 | 0.8 | 0.8 | 0.8 | 0.8 | 0.8 |
| Sulphur | 1.0 | 0.75 | 0.50 | 0.75 | 0.50 | 0.50 |
| ZnBr₂ | 5.0 | 5.0 | 5.0 | 5.0 | 5.0 | 3.4 |
| ML-4 212° F | ¹57 | ¹58 | ¹60 | ¹64 | ¹66 | ¹60 |
| Scorch, 265° F | 7 | 7 | 11 | 6 | 7 | 9 |

Table V—Continued
VINYLPYRIDINE COPOLYMER RUBBER WITH MPC BLACK
[Added zinc chloride]

| Stock code | V-A | V-B | V-C | V-D* | V-E* | V-F* |
|---|---|---|---|---|---|---|
| Cure: | | | | | | |
| Minutes | 22 | 45 | 100 | 22 | 100 | 100 |
| Pounds | 45 | 45 | 45 | 45 | 45 | 45 |
| Log R | 12.6 | 12.6 | 12.6 | 12.7 | 12.7 | >13.0 |
| 300% Modulus | 1,480 | 1,380 | 1,080 | 1,610 | 1,340 | 1,130 |
| Tensile: | | | | | | |
| T.R | 4,070 | 3,890 | 3,400 | 3,710 | 3,350 | 3,150 |
| 212° F | 2,140 | 1,950 | 1,510 | 1,710 | 1,450 | 1,350 |
| Elongation: | | | | | | |
| R.T | 560 | 600 | 630 | 530 | 550 | 580 |
| 212° F | 710 | 710 | 810 | 540 | 610 | 580 |
| Torsional Hysteresis: | | | | | | |
| R.T | .363 | .379 | .401 | .387 | .416 | .407 |
| 280° F | .149 | .187 | .217 | .173 | .210 | .208 |
| Cut-growth, 150° F | 1,051.8 | 1,373.2 | 1,279.2 | 418.0 | 388.4 | 396.3 |
| Relative abrasion resistance | 200.2 | 183.6 | 188.0 | 218.2 | 218.1 | 191.3 |

¹ Small rotor.

EXAMPLE VI

In this example, LFC carbon black is employed along with zinc chloride, with the results shown in Table VI.

Table VI
VINYLPYRIDINE COPOLYMER RUBBER WITH LFC (MOGUL-A) BLACK
[Added zinc chloride]

| Stock code | VI-A | VI-B | VI-C* | VI-D* |
|---|---|---|---|---|
| Curatives: | | | | |
| FLD | 0.2 | 0.0 | 0.0 | 0.0 |
| Sulfur | 1.75 | 1.75 | 1.75 | 1.50 |
| ZnCl₂ | 3.0 | 3.0 | 3.0 | 3.0 |
| ML-4 212° F | 106 | 108 | 110 | 112 |
| Scorch, 265° F | 11 | 17 | 11 | 12 |
| Cure: | | | | |
| Minutes | 45 | 45 | 30 | 45 |
| Pounds | 45 | 45 | 45 | 45 |
| Log R | >13.0 | 13.0 | 13.0 | >13.0 |
| 300% modulus | 1,620 | 1,630 | 1,310 | 1,530 |
| Tensile: | | | | |
| R.T | 3,570 | 3,800 | 3,810 | 3,890 |
| 212° F | 1,810 | 1,660 | 1,300 | 1,620 |
| Elongation: | | | | |
| R.T | 510 | 540 | 560 | 520 |
| 212° F | 580 | 560 | 600 | 570 |
| Torsional hysteresis: | | | | |
| R.T | .355 | .361 | .368 | .356 |
| 280° F | .156 | .146 | .182 | .162 |
| Cut-growth, 150° F | 1,052.5 | 3,051.0 | 2,783.7 | 2,434.7 |
| Relative abrasion resistance | 236.0 | 229.7 | 234.5 | 285.5 |

EXAMPLE VII

Zinc chloride with HAF carbon black is the feature of this example, which produces the results set forth in Table VII.

Table VII
VINYLPYRIDINE COPOLYMER RUBBER WITH HAF
[Added zinc chloride]

| Stock code | VII-A | VII-B | VII-C | VII-D* | VII-E* | VII-F* |
|---|---|---|---|---|---|---|
| Curatives: | | | | | | |
| FLD | 0.1 | 0.3 | 0.5 | 0.0 | 0.2 | 0.4 |
| Sulfur | 1.25 | 1.25 | 1.25 | 1.25 | 1.25 | 1.25 |
| ZnCl₂ | 3.0 | 3.0 | 3.0 | 3.0 | 3.0 | 3.0 |
| ML-4 212° F | 90 | 90 | 87 | 96 | 90 | 95 |
| Scorch, 265° F | 7 | 5 | 5 | 12 | 5 | 4 |
| Cure: | | | | | | |
| Minutes | 30 | 22 | 15 | 65 | 15 | 15 |
| Pounds | 45 | 45 | 45 | 45 | 45 | 45 |
| Log R | 13.0 | >13.0 | 12.3 | 12.9 | 12.6 | 12.7 |
| 300% modulus | 1,370 | 1,530 | 1,620 | 1,420 | 1,360 | 1,580 |
| Tensile: | | | | | | |
| R.T | 3,310 | 3,300 | 3,550 | 2,830 | 3,600 | 3,560 |
| 212° F | 1,500 | 1,700 | 1,780 | 1,190 | 1,530 | 1,840 |
| Elongation: | | | | | | |
| R.T | 530 | 490 | 510 | 450 | 530 | 530 |
| 212° F | 540 | 560 | 530 | 480 | 570 | 550 |
| Torsional hysteresis: | | | | | | |
| R.T | .355 | .360 | .338 | .367 | .350 | .320 |
| 280° F | .162 | .160 | .137 | .181 | .144 | .129 |
| Cut-growth, 150° F | 1,994.7 | 959.1 | 1,913.3 | 480.3 | 751.6 | 645.6 |
| Relative abrasion resistance | 178.1 | 188.8 | 189.5 | 183.9 | 192.3 | 190.8 |

EXAMPLE VIII

Table VIII shows results obtained with 1 part of zinc chloride and MPC carbon black.

Table VIII
VINYLPYRIDINE COPOLYMER RUBBER WITH MPC BLACK

[Added zinc chloride]

| Stock code | VIII-A | VIII-B | VIII-C* |
|---|---|---|---|
| Curatives: | | | |
| FLD | 0.5 | 0.7 | 0.3 |
| Sulfur | 1.75 | 1.75 | 1.75 |
| ZnCl₂ | 1.0 | 1.0 | 1.0 |
| ML-4 212° F | 77 | 78 | 82 |
| Scorch, 265° F | 8 | 7 | 7 |
| Cure: | | | |
| Minutes | 45 | 22 | 45 |
| Pounds | 45 | 45 | 45 |
| Log R | 11.7 | 11.7 | 11.6 |
| 300% modulus | 1,460 | 1,380 | 1,410 |
| Tensile: | | | |
| R.T | 3,100 | 3,820 | 3,730 |
| 212° F | 1,490 | 1,730 | 1,790 |
| Elongation: | | | |
| R.T | 480 | 560 | 550 |
| 212° F | 450 | 540 | 510 |
| Torsional hysteresis: | | | |
| R.T | .323 | .320 | .306 |
| 280° F | .156 | .152 | .119 |
| Cut-growth, 150° F | 289.3 | 307.8 | 270.6 |
| Relative abrasion resistance | 181.3 | 176.0 | 211.1 |

EXAMPLE IX

Table IX shows the effect of 1 part of zinc chloride with LFC carbon black.

Table IX
VINYLPYRIDINE COPOLYMER RUBBER WITH LFC (MOGUL-A) BLACK

[Added zinc chloride]

| Stock code | IX-A | IX-B* |
|---|---|---|
| Curatives: | | |
| FLD | 0.6 | 0.4 |
| Sulfur | 1.75 | 1.75 |
| ZnCl₂ | 1.0 | 1.0 |
| ML-4 212° F | 86 | 88 |
| Scorch, 265° F | 11 | 11 |
| Cure: | | |
| Minutes | 45 | 45 |
| Pounds | 45 | 45 |
| Log R | >13.0 | >13.0 |
| 300% modulus | 1,380 | 1,560 |
| Tensile: | | |
| R.T | 4,090 | 3,920 |
| 212° F | 1,860 | 1,830 |
| Elongation: | | |
| R.T | 630 | 540 |
| 212° F | 580 | 490 |
| Torsional hysteresis: | | |
| R.T | .295 | .266 |
| 280° F | .135 | .115 |
| Cut-growth, 150° F | 1,090.9 | 416.8 |
| Relative abrasion resistance | 186.4 | 188.2 |

EXAMPLE X

Here, 1 part of zinc chloride is used with HAF black; results are given in Table X.

Table X
VINYLPYRIDINE COPOLYMER RUBBER WITH HAF BLACK

[Added zinc chloride]

| Stock code | X-A* | X-B* | X-C* |
|---|---|---|---|
| Curatives: | | | |
| FLD | 0.2 | 0.4 | 0.6 |
| Sulfur | 1.5 | 1.5 | 1.5 |
| ZnCl₂ | 1.0 | 1.0 | 1.0 |
| ML-4 212° F | 71 | 70 | 70 |
| Scorch, 265° F | 6 | 5 | 5 |
| Cure: | | | |
| Minutes | 22 | 15 | 15 |
| Pounds | 45 | 45 | 45 |
| Log R | >13.0 | 12.9 | >13.0 |
| 300% modulus | 1,260 | 1,420 | 1,490 |
| Tensile: | | | |
| R.T | 3,200 | 3,390 | 3,470 |
| 212° F | 1,480 | 1,680 | 1,760 |
| Elongation: | | | |
| R.T | 540 | 520 | 520 |
| 212° F | 520 | 510 | 520 |
| Torsional hysteresis: | | | |
| R.T | .310 | .290 | .269 |
| 280° F | .127 | .114 | .105 |
| Cut-growth, 150° F | 530.9 | 441.0 | 386.7 |
| Relative abrasion resistance | 168.6 | 173.1 | 165.4 |

In the examples, the results with MPC black compounds show the advantage gained in improved resistance to abrasion and in resistance to cut-growth by the addition of the inorganic chloride. The results also show highest resistance to abrasion with zinc chloride and in decreasing order: zinc bromide, magnesium chloride and calcium chloride. Those compounds which were not hot-processed had a higher level of resistance to cut-growth than hot-processed stocks, and particularly so with zinc bromide. Overall, the addition of the halide conferred superior properties in comparison with properties of the control compounds. Results with LFC black (Mogul-A) and with HAF black show, by comparing stocks of near-equal modulus (approximately 1300), an evident advantage in higher resistance to abrasion and to cut-growth on flexing, due to the presence of the inorganic halide.

A review of the examples also indicates that the invention makes it possible to realize a generally higher level of tensile strength at 212° F. and a higher level of elongation at 212° F. These are interesting and useful properties which are not ordinarily observed in a tread-type stock of butadiene synthetic rubber.

It is desired to emphasive that the foregoing results are quite unlike results obtained when a metal halide is added to SBR. The addition of zinc chloride to a butadiene/styrene rubbery copolymer (SBR) has no significant influence on abrasion and cut-growth properties of the vulcanized product. In contrast, when zinch chloride is added to a butadiene-vinylpyridine rubbery copolymer a significant improvement is apparent in both abrasion resistance and cut-growth resistance, with either high pH or low pH carbon blacks, as shown in the examples. The practice of this invention also differs from Gibbons U.S. Patent No. 1,913,113, June 6, 1933, in that he works with rubber having an alkaline ash or rubber to which an alkali has been directly added, then treats that product with zinc chloride. His process results in reduced viscosity, whereas the addition of zinc chloride to the present vinylpyridine copolymer rubber increases the viscosity.

It is desired to point out that the invention requires incorporation of at least 1 part, and preferably at least 2 parts, of the metallic halide per 100 parts by weight of the copolymer, to impart the described advantage in resistance to cut-growth and abrasion. The practice of coagulating synthetic rubber latex with a salt such as zinc chloride would not incorporate an appreciable quantity of the salt in the final rubber because as a practical matter virtually all of the salt would be removed by the wash water, since the salt is freely soluble in water. The accessibility of a salt such as zinc chloride to the pyridine groups in latex coagulation would at best be only at the surface of the latex particles and even that reaction would be reduced by the hydrocarbon (butadiene) content of the rubber, limiting the solubility of the zinc chloride solution in the rubber. The invention therefore differs from practices such as those shown in Howland, U.S. Patent No. 2,784,165, March 5, 1957, and Westfall et al., U.S. Patent No. 2,429,439, October 21, 1947, in that the invention requires that the specified amount of metallic halide actually be mixed intimately with the coagulated copolymer, and actually remain with the copolymer and be present in the copolymer in such amount during the step of vulcanizing the final compounded stock.

It is also desired to point out that the advantages of the invention are not attainable by the use of organic halides, even in the presence of zinc oxide, as in Svetlik, U.S. Patent No. 2,848,442, August 19, 1958. In developing the best properties in a tread compound for example, it is desirable to increase resistance to cut-growth and to abrasion without undue increase in hardness. It is preferred to maintain the hardness near 60 on the Shore A scale. Now, with metal chlorides employed in accordance with the invention it has been discovered that this combination is possible; whereas with organic halide plus zinc oxide this combination is not realized. Vulcanization with organic halide plus zinc oxide gives increased hardness, and also causes a decrease in elongation. This is very undesirable in tread compounds.

Another pronounced difference is realized in attempting to mix tread-type compounds using organic halide chemicals. These chemicals are potent lachrymators and would cause extreme discomfort, if not injury, to operators if it were attempted to use them commercially in a rubber factory. Furthermore, within minutes after the addition of organic halide (chloranil), the vinylpyridine rubber proceeds to vulcanize, even on cold mill rolls. The stock develops tears, becomes very rough, then "lacy," then falls off the mill. In contrast, adding an inorganic chloride such as zinc chloride does increase the viscosity of the compound but does not cause the stock to vulcanize and fall off the mill.

The interaction between organic halides and pyridine groups is entirely different from the interaction between metallic halides and pyridine groups. The primary reaction of the organic halide is to form a quaternary salt, whereas the primary reaction of the metallic halide is to form an inorganic coordination compound.

Having thus described my invention, what I claim and desire to protect by Letters Patent is:

1. A method of increasing the cut-growth resistance of a vulcanized vinylpyridine copolymer rubber stock comprising mixing intimately with said copolymer, prior to vulcanization, a metallic halide selected from the group consisting of magnesium chloride, calcium chloride, zinc chloride and zinc bromide, in amount of from 1 to 8 parts by weight per 100 parts of said copolymer, and a vulcanizing agent for the said copolymer, the said copolymer being selected from the group consisting of (1) copolymers of from 70% to 95% of butadiene and from 30% to 5% of a monovinylpyridine, and (2) terpolymers of from 70% to 95% of butadiene, from 30% to 5% of a monovinylpyridine and up to 25% of styrene with the proviso that the sum of the styrene content and the vinylpyridine content shall not exceed 30%, the said percentages being expressed by weight and being based on the whole copolymer as 100%, and thereafter vulcanizing the copolymer with the said amount of intimately admixed metallic halide contained therein.

2. A method of increasing the cut-growth resistance of a vulcanized vinylpyridine copolymer rubber stock comprising mixing intimately with said copolymer, prior to vulcanization, a metallic halide selected from the group consisting of magnesium chloride, calcium chloride, zinc chloride and zinc bromide, in amount of from 2 to 5 parts by weight, a reinforcing filler in amount of from 25 to 75 parts by weight, per 100 parts by weight of said copolymer, and sulfur as a vulcanizing agent for the said copolymer, the said copolymer being a copolymer of from 70% to 95% of butadiene and from 30% to to 5% of a monovinylpyridine, the said percentages being expressed by weight and being based on the whole copolymer as 100%, and thereafter vulcanizing the copolymer with the said amount of intimately admixed metallic halide contained therein.

3. A method as in claim 2, in which the said metallic halide is zinc chloride.

4. A method as in claim 2, in which the said metallic halide is zinc chloride and the said monovinylpyridine is 2-methyl-5-vinylpyridine.

5. A method as in claim 2, in which the said metallic halide is zinc chloride, the said reinforcing filler is carbon black, and the said monovinylpyridine is 2-methyl-5-vinylpyridine.

6. A method of increasing the cut-growth resistance of a vulcanized vinylpyridine copolymer rubber stock comprising mixing intimately with said copolymer, prior to vulcanization, a metallic halide selected from the group consisting of magnesium chloride, calcium chloride, zinc chloride and zinc bromide, in amount of from 2 to 5 parts by weight, a reinforcing filler in amount of from 25 to 75 parts by weight, per 100 parts by weight of said copolymer, and a vulcanizing agent for the said copolymer, the said copolymer being a terpolymer of from 70 to 95% of butadine, from 30 to 5 of a monovinylpyridine and up to 25% of styrene with the proviso that the sum of the styrene content and the vinylpyridine content shall not exceed 30%, the said percentages being expressed by weight and being based on the whole copolymer as 100%, and thereafter vulcanizing the copolymer with the said amount of intimately admixed metallic halide contained therein.

7. A method as in claim 6, in which the said metallic halide is zinc chloride.

8. A method as in claim 6, in which the said metallic halide is zinc chloride and the said monovinylpyridine is 2-methyl-5-vinylpyridine.

9. A method as in claim 6, in which the said metallic halide is zinc chloride, the said reinforcing filler is carbon black, and the said monovinylpyridine is 2-methyl-5-vinylpyridine.

10. A vulcanizable composition comprising a uniform mixture of a vinylpyridine copolymer rubber with a metallic halide selected from the group consisting of magnesium chloride, calcium chloride, zinc chloride and zinc bromide, in amount of from 1 to 8 parts by weight per 100 parts by weight of said copolymer, and sulfur as a vulcanizing agent for the said copolymer, the said copolymer being selected from the group consisting of (1) copolymers of from 70% to 95% of butadiene and from 30% to 5% of a monovinylpyridine, and (2) terpolymers of from 70% to 95% of butadiene, from 30% to 5% of a monovinylpyridine and up to 25% of styrene with the proviso that the sum of the styrene content and the vinylpyridine content shall not exceed 30%, the said percentages being expressed by weight and being based on the whole copolymer as 100%, the said composition being vulcanizable to form a vulcanizate having enhanced cut-growth resistance.

11. A vulcanizable composition comprising a uniform mixture of a vinylpyridine copolymer rubber with a metallic halide selected from the group consisting of magnesium chloride, calcium chloride, zinc chloride and zinc bromide, in amount of from 2 to 5 parts by weight, a reinforcing filler in amount of from 25 to 75 parts by weight, per 100 parts by weight of said copolymer, and a vulcanizing agent for the said copolymer, the said copolymer being a copolymer of from 70% to 95% of butadiene with from 30% to 5% of a monovinylpyridine, the said percentages being expressed by weight and being based on the whole copolymer as 100%, the said composition being vulcanizable to form a vulcanizate having enhanced cut-growth resistance.

12. A vulcanizable composition as in claim 11, in which the said metallic halide is zinc chloride.

13. A vulcanizable composition as in claim 11, in which the said metallic halide is zinc chloride and the said monovinylpyridine is 2-methyl-5-vinylpyridine.

14. A vulcanizable composition as in claim 11, in which the said metallic halide is zinc chloride, the said reinforcing filler is carbon black, and the said monovinylpyridine is 2-methyl-5-vinylpyridine.

15. A vulcanizable composition comprising a uniform mixture of a vinylpyridine copolymer rubber with a metallic halide selected from the group consisting of magnesium chloride, calcium chloride, zinc chloride and zinc bromide, in amount of from 2 to 5 parts by weight, a reinforcing filler in amount of from 25 to 75 parts by weight, per 100 parts by weight of said copolymer, and a vulcanizing agent for the said copolymer, the said copolymer being a terpolymer of from 70% to 95% of butadiene, from 30% to 5% of monovinylpyridine and up to 25% of styrene with the proviso that the sum of the styrene content and the vinylpyridine content shall not exceed 30%, the said percentages being expressed by weight and being based on the whole copolymer as 100%, the said composition containing a vulcanizing agent and being vulcanizable to form a vulcanizate having enhanced cut-growth resistance.

16. A vulcanizable composition as in claim 15, in which the said metallic halide is zinc chloride.

17. A vulcanizable composition as in claim 15, in which the said metallic halide is zinc chloride and the said monovinylpyridine is 2-methyl-5-vinylpyridine.

18. A vulcanizable composition as in claim 15, in which the said metallic halide is zinc chloride, the said reinforcing filler is carbon black, and the said monovinylpyridine is 2-methyl-5-vinylpyridine.

19. A vulcanized composition characterized by enhanced cut-growth resistance comprising a uniform mixture of a vinylpyridine copolymer rubber with a metallic halide selected from the group consisting of magnesium chloride, calcium chloride, zinc chloride and zinc bromide, in amount of from 1 to 8 parts by weight per 100 parts by weight of said copolymer, and a vulcanizing agent for the said copolymer, the said copolymer being selected from the group consisting of (1) copolymers of from 70% to 95% of butadiene and from 30% to 5% of a monovinylpyridine, and (2) copolymers of from 70% to 95% of butadiene, from 30% to 5% of a monovinylpyridine and up to 25% of styrene with the proviso that the sum of the styrene and content and the vinylpyridine content shall not exceed 30%, the said percentages being by weight and being based on the whole copolymer as 100%.

20. A vulcanized composition characterized by enhanced cut-growth resistance comprising a uniform mixture of a vinylpyridine copolymer rubber with a metallic halide selected from the group consisting of magnesium chloride, calcium chloride, zince chloride and zinc bromide, in amount of from 2 to 5 parts by weight, a reinforcing filler in amount of from 25 to 75 parts by weight, per 100 parts by weight of said copolymer, and sulfur as a vulcanizing agent for the said copolymer, the said copolymer being a copolymer of from 70% to 95% of butadiene and from 30% to 5% of a monovinylpyridine, the said percentages being expressed by weight and being based on the whole copolymer as 100%.

21. A vulcanized composition as in claim 20, in which the said metallic halide is zinc chloride.

22. A vulcanized composition as in claim 20, in which the said metallic halide is zinc chloride, and the said monovinylpyridine is 2-methyl-5-vinylpyridine.

23. A vulcanized composition as in claim 20, in which the said metallic halide is zinc chloride, the said reinforcing filler is carbon black, and the said monovinylpyridine is 2-methyl-5-vinylpyridine.

24. A vulcanized composition characterized by enhanced cut-growth resistance comprising a uniform mixture of vinylpyridine copolymer rubber with a metallic halide selected from the group consisting of magnesium chloride, calcium chloride, zinc chloride and zinc bromide, in amount of from 2 to 5 parts by weight, a reinforcing filler in amount of from 25 to 75 parts by weight, per 100 parts by weight of said copolymer, and a vulcanizing agent for the said copolymer, the said copolymer being a terpolymer of from 70% to 95% of butadiene, from 30% to 5% of a monovinylpyridine and up to 25% of styrene with the proviso that the sum of the styrene content and the vinylpyridine content shall not exceed 30%, the said percentages being expressed by weight and being based on the whole copolymer as 100%.

25. A vulcanized composition as in claim 24, in which the said metallic halide is zinc chloride, and the said vulcanizing agent is sulfur.

26. A vulcanized composition as in claim 24, in which the said metallic halide is zinc chloride, and the said monovinylpyridine is 2-methyl-5-vinylpyridine.

27. A vulcanized composition as in claim 24, in which the said metallic halide is zinc chloride, the said reinforcing filler is carbon black, and the said monovinylpyridine is 2-methyl-5-vinylpyridine.

References Cited in the file of this patent

UNITED STATES PATENTS

| | | |
|---|---|---|
| 2,434,129 | Throdahl | Jan. 6, 1948 |
| 2,473,016 | Davis | June 14, 1949 |
| 2,481,810 | Barton | Sept. 13, 1949 |
| 2,565,812 | Harbison | Aug. 28, 1951 |
| 2,710,287 | Barton | June 7, 1955 |
| 2,825,720 | Tawney | Mar. 4, 1958 |
| 2,927,099 | Railsback | Mar. 1, 1960 |
| 3,014,005 | Howland et al. | Dec. 19, 1961 |